United States Patent
Guo et al.

(10) Patent No.: US 9,881,374 B2
(45) Date of Patent: Jan. 30, 2018

(54) METHOD FOR ESTABLISHING PREDICTION MODEL BASED ON MULTIDIMENSIONAL TEXTURE OF BRAIN NUCLEAR MAGNETIC RESONANCE IMAGES

(71) Applicant: CAPITAL MEDICAL UNIVERSITY, Beijing (CN)

(72) Inventors: Xiuhua Guo, Beijing (CN); Ni Gao, Beijing (CN); Jingjing Wang, Beijing (CN); Yanxia Luo, Beijing (CN); Jin Guo, Beijing (CN)

(73) Assignee: CAPITAL MEDICAL UNIVERSITY, Beijing (CN)

( * ) Notice: Subject to any disclaimer, the term of this patent is extended or adjusted under 35 U.S.C. 154(b) by 48 days.

(21) Appl. No.: 15/178,716

(22) Filed: Jun. 10, 2016

(65) Prior Publication Data

US 2016/0284086 A1    Sep. 29, 2016

Related U.S. Application Data

(63) Continuation of application No. PCT/CN2014/001129, filed on Dec. 16, 2014.

(30) Foreign Application Priority Data

Jan. 17, 2014    (CN) .......................... 2014 1 0023582

(51) Int. Cl.
*G06T 7/42* (2017.01)
*G06T 7/00* (2017.01)
*G06T 7/11* (2017.01)
*G06T 7/41* (2017.01)
*G06T 7/187* (2017.01)

(52) U.S. Cl.
CPC .......... *G06T 7/0016* (2013.01); *G06T 7/0012* (2013.01); *G06T 7/11* (2017.01); *G06T 7/187* (2017.01); *G06T 7/41* (2017.01); *G06T 2207/10088* (2013.01); *G06T 2207/20016* (2013.01); *G06T 2207/20081* (2013.01); *G06T 2207/30016* (2013.01)

(58) Field of Classification Search
CPC combination set(s) only.
See application file for complete search history.

(56) References Cited

U.S. PATENT DOCUMENTS 6,031,935 A * 2/2000 Kimmel .................. G06K 9/48
                                                 382/170
7,574,409 B2 * 8/2009 Patinkin ............... G06Q 10/107
                                                 706/12

(Continued)

*Primary Examiner* — Tsung-Yin Tsai
(74) *Attorney, Agent, or Firm* — Wayne & King LLC (57) ABSTRACT

Disclosed is a method for establishing a prediction model based on a multidimensional texture of brain nuclear magnetic resonance images. Images are segmented using a region growing method, a contourlet transform method is used to extract an edge texture feature parameter of ROIs, a multidimensional database is established, and a prediction model is established using various data mining methods, comprising a Gaussian process, a support vector machine, a random forest, a Lasso regression and a semi-supervised support vector machine. The ROIs comprise a hippocampus region and an entorhinal cortex region.

1 Claim, 4 Drawing Sheets

(56) References Cited

U.S. PATENT DOCUMENTS

| | | | | |
|---|---|---|---|---|
| 7,756,306 | B2* | 7/2010 | Nowinski | G06K 9/3233 |
| | | | | 382/128 |
| 7,840,247 | B2* | 11/2010 | Liew | A61B 6/482 |
| | | | | 378/54 |
| 8,585,599 | B2* | 11/2013 | Nakahira | G01S 7/52026 |
| | | | | 382/128 |
| 2006/0062442 | A1* | 3/2006 | Arnaud | A61B 6/505 |
| | | | | 382/128 |
| 2010/0106002 | A1* | 4/2010 | Sugiyama | A61B 5/055 |
| | | | | 600/410 |
| 2011/0147004 | A1* | 6/2011 | Neelamani | G01V 1/36 |
| | | | | 166/369 |
| 2011/0286630 | A1* | 11/2011 | Harder | G06T 15/08 |
| | | | | 382/103 |
| 2012/0063662 | A1* | 3/2012 | Kwon | G06T 5/003 |
| | | | | 382/132 |
| 2013/0142412 | A1* | 6/2013 | Oh | A61B 6/4241 |
| | | | | 382/132 |
| 2014/0099029 | A1* | 4/2014 | Savvides | G06K 9/481 |
| | | | | 382/197 |
| 2014/0119668 | A1* | 5/2014 | Kwon | G06T 11/005 |
| | | | | 382/232 |

* cited by examiner

METHOD FOR ESTABLISHING PREDICTION MODEL BASED ON MULTIDIMENSIONAL TEXTURE OF BRAIN NUCLEAR MAGNETIC RESONANCE IMAGES

CROSS-REFERENCE TO RELATED APPLICATIONS

This application is a continuation of International Patent Application No. PCT/CN2014/001129 with an international filing date of Dec. 16, 2014 designating the United States, now pending and further claims priority benefits to Chinese Patent Application No. 201410023582.5 filed Jan. 17, 2014. The content of the aforementioned applications, including any intervening amendments thereto, is incorporated herein by reference.

FIELD OF THE INVENTION

The present application relates to the field of medicine, specifically to a method for establishing a prediction model based on multidimensional textures of brain nuclear magnetic resonance images.

BACKGROUND OF THE INVENTION

In aided diagnosis of early Alzheimer disease (AD), it is important to identify features of the ROIs (reactive oxygen intermediates including entorhinal cortex and hippocampus) in the magnetic resonance imaging (MRI) images. However, the MRI technology can only use the hippocampus atrophy as one of the indicators to distinguish a patient from a healthy person. The explanations of doctors to the MRI images are easily affected by subjectivity and lack of consistency. Moreover, it is hard for the MRI technology to evaluate correctly how serious the symptom of the AD is.

1, the Prior Image Processing Technology

Contourlet Transform

The Contourlet transform inherits the anisotropic scale relationship of Curvelet transform. In a certain sense, the Contourlet transform is another implementation of the Curvelet transform. The basic idea of Contourlet transform is to capture edge point discontinuities using multiscale decomposition similar to wavelet firstly, and then to converge the point discontinuities with similar location to form contour segments according to direction information.

The Contourlet transform may be divided into two parts: Laplacian Pyramid (LP) filter structure and 2-D directional filter bank (DFB). The LP decomposition first produce a lowpass sampling approach of the original signals and a difference image of the original image and a lowpass predication image, and further decompose the lowpass image obtained to gain a lowpass image and a difference image of the next level. Multiresolution decomposition of image is obtained in this gradually filtering. The DFB adopts conjugate mirror filters with a sector structure, and transforms one level binary tree structure of a directional filter into a structure with $2^l$ parallel passages.

The Contourlet transform is a new two-dimensional transform method for image representations, which has properties of multiresolution, localization, directionality, critical sampling and anisotropy. Its basic functions are multiscale and multidimensional. The contours of original images, which are the dominant features in natural images, can be captured effectively with a few coefficients by using Contourlet transform.

However, when the new transform method is used to process MRI images of different body parts, it needs to reconstruct new algorithm and select suitable parameters using basis functions. Therefore, there still are many theoretical issues to be studied. The Contourlet transform has been successfully used to solve actual problems such as image fusion. However, there are few references on extraction of image texture features using the Contourlet transform. No one has disclosed to use the second generation wavelet transform and Contourlet transform to extract textures of AD brain MRI images.

2, the Prior Typical Prediction Model Includes Supervised Machine Learning Model and Semi-Supervised Machine Learning Model Supervised Machine Learning Model Gaussian Process (GP):

The Gaussian process classification algorithm is a supervised learning algorithm, which is established under the Bayesian framework, and it is first used to solve the problem of nonlinear value prediction. Provided there is a data set $D=\{(x_i, y_i)|y_i=\pm 1, i=1, 2, \ldots, n\}$, the essence of binary classification is to find a suitable mapping $f(x)$ to ensure that the sample can be classified correctly using $y=f(x)$. The basic idea of classification using Gaussian regression algorithm is to find a suitable $f(x)$ aiming at maximizing the posterior probability in Bayesian rule under the assumption that the $f(x)$ is a Gaussian process. It is firstly assumed that there is an implicit function $f(x)=\emptyset(x)^T w$, which defines the mapping relationship between input properties and output properties (class tags). It is further assumed that the class tags are independent identically distributed, and are subjected to conditional probability $p(y|f(x))$. Thus, for the binary classification, the probability that the sample $x_i$ belongs to class $y_i$ is:

$$p(y_i|f_i)=\sigma(y_i f_i)$$

wherein, $f_i=f(x_i)$ is an implicit function, $\sigma(\cdot)$ is a Sigmoid class function, such as a logistic function or a cumulative Gaussian function. Since training samples are independent to each other, the corresponding likelihood probability is:

$$p(y|f) = \prod_{i=1}^{n} p(y_i|f(x_i)) = \prod_{i=1}^{n} \sigma(y_i|f_i)$$

wherein, for the sample set $D=\{(x_i, y_i)|y_i=\pm 1, i=1, 2, \ldots, n\}$, the Gaussian process classifier assumes that the $f(x) \sim GP(0, k)$ is a Gaussian process with mean value equivalent to zero to simplify calculation, i.e. $p(f|x)$ is a multidimensional Gaussian density function:

$$p(f|x) = \frac{1}{(2\pi)^{L/2}|k|^{1/2}} \exp\left\{-\frac{1}{2} f^T K^{-1} f\right\}$$

wherein, K is a covariance matrix, which is a kernel function. Therefore, the posterior probability can be obtained according to Bayesian formula:

$$p(f|y, X) = \frac{p(y|f)p(f|X)}{p(y|X)}$$

wherein, $p(y|f)$ is a likelihood function, $p(y|X)=\int p(y|f)p(f|x)df$ is a marginal probability density.

The training to the Gaussian process classifier is namely the estimation to the posterior probability. The estimated value q(f|y, X) of the posterior probability p(f|y,X) can be calculated by Laplace method. Therefore, the probability that the class tag of a given testing data point x* belongs to positive class is:

$$\pi^* = p(y^* = +1 | X, y, x^*) = \int \emptyset(f^*) q(f^* | X, y, x^*) df^*$$

According to the principle of Gaussian process classification, the numeric data set obtained after feature extraction is inputted into the Gaussian process classifier. The estimated value q(f|y, X) of the posterior probability can be calculated after hyper-parameter optimization. Then, prediction results related to testing set can be obtained.

1) Support Vector Machine (SVM):

Support vector machine method is a machine learning method based on VC dimension theory of statistical learning theory and structure risk minimum principle. Its principle is to find an optimal classification hyperplane which satisfies the requirements of classification, so that the hyperplane ensures classification accuracy and the margin of the hyperplane is largest.

In theory, the support vector machine is capable of realizing the optimal classification of linear classifiable data. Taking the classification of two kinds of data as an example, it is provided that the training sample set is $(x_i, y_i)$, $i=1, 2, \ldots, l$, $x \in \{\pm 1\}$, and the hyperplane is written as $(w \cdot x_i) + b = 0$. In order to ensure that the classification plane is correct to all the samples and has a classification space, the following restriction should be satisfied: $y_i[(w \cdot x_i) + b] \geq 1$, $i=1, 2, \ldots, l$. It can be calculated that the classification space is $2/\|w\|$. Thus, the problem of constructing an optimal hyperplane has been transformed to the problem of solving the following formula under the restriction formula:

$$\min \emptyset(w) = \frac{1}{2} \|w\|^2 = \frac{1}{2}(w \cdot w)$$

In order to solve this problem of restriction optimization, the Lagrange function is introduced:

$$L(w,b,a) = \frac{1}{2}\|w\| - \alpha(y(w \cdot x) + b) - 1$$

wherein, $\alpha > 0$, and it is a Lagrange multiplier. The solution of the problem of restriction optimization is determined by the saddle point of the Lagrange function. Moreover, the partial derivative of the solution of the problem of restriction optimization at the saddle point with respect to w and b is zero. Thus, the QP (quadratic programming) problem is transformed to a corresponding dual problem:

$$\max Q(\alpha) = \sum_{j=1}^{l} \alpha_j - \frac{1}{2} \sum_{i=1}^{l} \sum_{j=1}^{l} \alpha_i \alpha_j y_i y_j (x_i \cdot x_j)$$

$$\text{s.t.} \sum_{j=1}^{l} \alpha_j y_j = 0, j = 1, 2, \ldots, l$$

the optimal solution $\alpha^* = (\alpha_1^*, \alpha_2^*, \ldots, \alpha_l^*)^l$ is obtained.

Calculating the optimal weight vector w* and optimal bias b*, which are:

$$w^* = \sum_{j=1}^{l} \alpha_j^* y_j x_j$$

$$b^* = y_i - \sum_{j=1}^{l} y_j \alpha_j^* (x_j \cdot x_i)$$

Wherein, the subscript $j \in \{j | \alpha_j^* > 0\}$. Thus, the optimal classification hyperplane is obtained: $(w^* \cdot x) + b^* = 0$, and the optimal classification function is:

$$f(x) = \text{sgn}\{(w^* \cdot x) + b^*\} = \text{sgn}\left\{\sum_{j=1}^{l} \alpha_j^* y_j (x_j \cdot x_i) + b^*\right\}, x \in R^n$$

For the linear unclassifiable case, the main idea of SVM is to map the input vector to a high dimensional eigenvector space, and construct the optimal classification plane in the feature space.

Doing transform $\emptyset$ to x from the input space $R^n$ to the feature space H, it can be obtained:

$$x \to \emptyset(x) = (\emptyset_1(x), \emptyset_2(x), \ldots \emptyset_l(x))^T$$

Replacing the input vector x with the eigenvector $\emptyset(x)$, the optimal classification function can be obtained:

$$f(x) = \text{sgn}(w \cdot \emptyset(x) + b) = \text{sgn}\left(\sum_{j=1}^{l} \alpha_i y_i \emptyset(x) + b\right)$$

2) Random Forests (RF):

Random forest is a classification and predication model proposed by Leo Breiman, which has been applied in many fields.

The basic idea of constructing random forests is continuously generating training sample and testing sample by the technique of bootstrap resampling. The training sample generates a plurality of classification tree constituting the random forests. The classification result of the testing data is determined according to the vote of classification tree.

It is provided that the content of original sample is N, the variables representing various genes are $x_1, x_2, \ldots, x_m$. Randomly sampling with replacement new self-service samples with the number of b, and hence forming classification trees with the number of b. The samples that are not sampled each time form the data out of bag (OOB) with the number of b. the data out of bag acting as testing sample can be used to evaluate the importance of the various variables in the classification. The realization process is as follows:

Using the self-service samples to form each tree classifier, and classifying the corresponding OOB at the same time, it can hence obtain the voting scores of each sample in the OOB of the self-service samples with the number of b, which can be written as $\text{vote}_1, \text{vote}_2, \ldots$, votes.

Randomly changing the order of the value of the variables $x_i$ in the OOB samples with the number of b, it forms new OOB testing samples. Then, classifying the new OOB by the constructed random forests and obtaining the voting scores of each sample according to the number of sample that is judged to be correct.

3) Lasso:

The basic idea of Lasso (the least absolute shrinkage and selection operator) method is to minimize the sum of squared residuals under the restriction that the sum of absolute regression coefficient is less than a constant, thus generating some regression coefficient rigidly equaling to zero. Although this is a biased estimation to decrease the variance of the predicted value, the prediction accuracy of the model will be increased accordingly and the model obtained is easier to be explained. For the case with a plurality of independent variables, we always hope to determine a model with fewer variables to present the best effect. The selection criteria of Lasso is to minimize the penalty function $$\frac{1}{n}\sum_{i=1}^{n}(Y_i - X_i\beta_i)^2 + \lambda\sum_{j=1}^{p}|\beta_j|,$$

and adopts the least-angle regression algorithm.

The regression steps of Lasso are as follows:

a) Provided the estimated initial value of $\beta$ is $\beta^{(0)}$, fixing $\lambda$ and selecting the least-squares estimation $\hat{\beta}_{LS}$ as the initial value of $\beta$. That is to say, $\beta^{(0)} = \hat{\beta}_{LS} = (X'X)^{-1}X'Y$;

b) Obtaining the estimation to $\beta$(written as $\tilde{\beta}$) when fixing $\lambda$ according to the estimated initial value $\beta^{(0)}$ and the following iterative formula:

$$\beta^{(1)} = \beta^{(0)} - [\nabla^2 Q_{LS}\beta^{(0)} + n\Sigma_\lambda\beta^{(0)}]^{-1}[\nabla Q_{LS}\beta^{(0)} + nU_\lambda\beta^{(0)}]$$

wherein, $\nabla^2 Q_{LS}\beta^{(0)} = X'X$, $\nabla Q_{LS}\beta^{(0)} = -2X(Y - X\beta^{(0)})$, $\Sigma_\lambda\beta^{(0)} = \lambda \mathrm{diag}(1/|\beta_0|, \ldots, 1/|\beta_p|)$, if $\beta_j = 0$, the value of $1/|\beta_j|$ can be evaluated to be a very large number. $U_\lambda\beta^{(0)} = U_\lambda\beta^{(0)}\beta^{(0)}$;

c) Changing the value of $\lambda$ in the range of 0~1, under the restriction of $\lambda$, constructing generalized cross validation $$GCV(\lambda) = \frac{|Y - X\tilde{\beta}_\lambda|^2}{(1 - e(\lambda)/n)^2}.$$

The penalty function that minimizes the cross validation is the optimal selection penalty parameter $\lambda$, $\bar{\lambda} = \arg\min GCV(\lambda)$, and hence the Lasso estimation to $\beta$ is $\hat{\beta}_{Lasso} = \tilde{\beta}_{Lasso}$.

(1) Semi-Supervised Support Vector Machine (S3VM):

The semi-supervised learning is a key problem studied in the field of pattern recognition and machine learning in recent years, which mainly considers the problem of how to train and classify with a few tag samples and a plurality of samples without tag. The semi-supervised learning algorithm based on support vector machine is a model first proposed by Kristin, which is realized by mixed integer programming method. Later, Joachims, Demirez et al. proposed some similar methods one after another among which the transductive support vector machine (TSVM) algorithm is more typical.

Given that a training set $T = \{(x_1, y_1), \ldots, (x_l, y_l), x_{j+1}, \ldots, x_{j+k}\}$, wherein, $x_i \in X = R_n$, the top l samples are samples with classification tag, i.e. when $i = 1, 2, \ldots, l$, $y_i \in Y = \{-1, 1\}$; the down k samples are samples without classification tag. Finding a decision function $f(x) = \mathrm{sgn}(\omega^T\varphi(x) + b)$ at $X = R^n$ to deduce the class (positive class or negative class) of x of any pattern (wherein, $\omega$ is weight vector, $\varphi(\cdot)$ is a mapping function, b is a constant, and the kernel function $K(x_i, x_j) = <\varphi(x_i), \varphi(x_j)>$). Accordingly, the solving process is actually to find a principle to divide the points in $R^n$ into two parts.

Obviously, it exists $\omega \in R^n$, $b \in R$, to ensure that it exists $y_i(\omega^T\varphi(x_i) + b) + \tau_i \geq 1$, $\xi_i \geq 0$, $i = 1, \ldots, l$ for each sample with classification tag $x_i(i = 1, \ldots, l)$. It exists $(\omega^T\varphi(x_j) + b) + r_j \geq 1$, $\omega^T\varphi(x_j) + b - s_j \leq -1$, $r_j, s_j \geq 0$, $j = l+1, \ldots, l+k$.

Currently, such a classification learning machine is constructed by maximizing soft margin and slack variables $\xi = (\xi_1, \xi_2, \ldots, \xi_l)$, $r = (r_{l+1}, r_{l+2}, \ldots, r_{l+k})$, $s = (s_{l+1}, s_{l+1}, \ldots, s_{l+k})$ are introduced. Obviously, $\xi, r, s$ reflect the case that the training set is wrongly classified. Thus, it can construct the degree that describes the training set wrongly classified, and it may as well to adopt $\Sigma_{i=1}^{l}\xi_i^2$, $\Sigma_{j=1}^{l+k}r_js_i$ as a mensuration to degree that describes the training set wrongly classified. At the same time, it is expected that the wrongly classified degree $\Sigma_{i=1}^{l}\xi_i^2$, $\Sigma_{j=1}^{l+k}r_js_i$ is as small as better, that the optimal classified hyperplane can be solved out by minimizing $\frac{1}{2}(\omega^T\omega + b^2)$, and that the affection to the classification result is limited. In order to fully take the three aims into account, the penalty parameters $c_1$ and $c_2$ are introduced as a weight to balance the three aims. That is to say, the aim function is minimized as:

$$\frac{1}{2}(\omega^T\omega + b^2) + c_1\sum_{i=1}^{l}\xi_i^2 + c_2\sum_{j=1}^{l+k}r_js_i$$

Thus, the problem of solving the optimal classified hyperplane is transformed into the problem of optimization:

$$\min_{\omega,b,\xi,r,s}\left(\frac{1}{2}(\omega^T\omega + b^2) + c_1\sum_{i=1}^{l}\xi_i^2 + c_2\sum_{j=1}^{l+k}r_js_i\right)$$

s.t. $y_i(\omega^T\varphi(x_i) + b) + \xi_i \geq 1$, $i = 1, \ldots, l$ $\omega^T\varphi(x_j) + b + r_j \geq 1$, $\omega^T\varphi(x_j) + b - s_j \leq -1$, $r_j, s_j \geq 0$, $j = l+1, \ldots, l+k$ Given $$L(\omega, b, \xi, r, \alpha, \beta, \gamma, u, v) = \frac{1}{2}(\omega^T\omega + b^2) + c_1\sum_{i=1}^{l}\xi_i^2 + c_2\sum_{j=1}^{l+k}r_js_i - $$

$$\sum_{i=1}^{l}\alpha_i[y_i(\omega^T\varphi(x_i) + b) + \xi_i - 1] - \sum_{j=l+1}^{l+k}\beta_j(\omega^T\varphi(x_j) + b + r_j - 1) - $$

$$\sum_{j=l+1}^{l+k}\gamma_j(-\omega^T\varphi(x_j) - b + r_j - 1) - \sum_{j=l+1}^{l+k}u_jr_j - \sum_{j=l+1}^{l+k}v_js_j$$

Thus, $\frac{\partial L}{\partial \omega} = 0 => \omega = \sum_{i=1}^{l}y_i\alpha_i\varphi(x_i) + \sum_{j=l+1}^{l+k}(\beta_j - \gamma_j)\varphi(x_j)$, $\frac{\partial L}{\partial b} = 0 => b = \sum_{i=1}^{l}y_i\alpha_i + \sum_{j=l+1}^{l+k}\beta_j - \gamma_j$, $\frac{\partial L}{\partial b} = 0 => \xi_i = \frac{1}{2c_1}\alpha_i$, $\frac{\partial L}{\partial b} = 0 => s_j = \frac{\beta_j + u_j}{c_2}$, $\frac{\partial L}{\partial b} = 0 => r_j = \frac{\gamma_j + v_j}{c_2}$, It can be obtained with substitution:

$$\min_{\omega,b,\xi,r,s}\left(\frac{1}{2}\sum_{i_1=1}^{l}\sum_{i_2=1}^{l}y_{i_1}y_{i_2}\alpha_{i_1}\alpha_{i_2}K(x_{i_1}, x_{i_2}) + \right.$$

$$\frac{1}{2c_1}\sum_{i=1}^{l}\alpha_i^2 + \frac{1}{2}\left(\sum_{i=1}^{l}y_i\alpha_i + \sum_{j=l+1}^{l+k}(\beta_j - \gamma_j)\right)^2 + $$

$$\frac{1}{2}\sum_{j_1=l+1}^{l+k}\sum_{j_2=l+1}^{l+k}(\beta_{j_1} - \gamma_{j_1})(\beta_{j_2} - \gamma_{j_2})K(x_{j_1}, x_{j_2}) + $$

-continued $$\sum_{i=1}^{l}\sum_{j=l+1}^{l+k}y_i\alpha_i(\beta_j-\gamma_i)K(x_i,x_j)+$$
$$\frac{1}{c_2}\sum_{j=1+k}^{l+k}(\beta_j+u_j)(\gamma_j+v_j)-\sum_{i=1}^{l}\alpha_i-\sum_{j=1+k}^{l+k}(\beta_j+\gamma_j)\Bigg)$$

s.t. $\alpha_i, \beta_j, \gamma_j, u_j, v_j \geq 0$.

SUMMARY OF THE INVENTION

The objective of the present invention is to provide a method for establishing prediction models based on multi-dimensional textures of brain nuclear magnetic resonance images so as to establishing various kinds of prediction models in order to effectively find the MCI patient, diagnose early AD and observe the brain structure change of healthy geriatric population.

The present invention synthesizes the advantages of region growing method in the prior art, utilizes Contourlet transform to extract margin texture features of ROIs. The texture extraction method is comprehensive and novel, which ensures the realization of the objective of the present invention.

The present invention adopts the following technical route to establish a method for segmenting MRI images of ROIs of geriatric population who has MCI and early AD nidus and who are healthy, and for extracting texture features (specifically see FIG. 3), and prediction models for judging related ROIs features have been established accordingly:

1) establishing a ROIs database;
2) segmenting the ROIs in the images using the region growing method;
3) processing the images using the Contourlet transform to extract the following variables: entropy, mean gray, correlation, energy, homogeneity, variance, maximum probability, inverse difference moment, cluster tendency, contrast, sum mean, difference mean, sum entropy and difference entropy;
4) establishing a database of image feature parameters using the variables obtained in steps (2) and (3);
5) establishing the prediction model according to the database in step (4), wherein methods for establishing the prediction model comprises Gaussian process, support vector machine, random forests and Lasso regression; and
6) repeatedly verifying the feature parameters obtained in step (4) using a sample to modify the prediction model so as to obtain an ideal model with correct results.

At the present, there is no uniform definition to the textures of images. It is widely accepted that the textures of images describe the surface gray of objects or the change of color. Such change is related to the properties of the object, which is a repetition of a certain texture primitive.

Adopting Contourlet transform, the following texture feature parameters can be obtained:

Entropy: $f_4=\sum_{i=0}^{K-1}\sum_{j=0}^{K-1}c_{ij}\log c_{ij}$ reflects the randomness of Image's texture;

Mean gray:

$$f_{15}=\frac{1}{Q}\Sigma p(i,j)$$

reflects the gathering tendency of all the gray values of the image;

Correlation:

$$f_5=\frac{\sum_{i=0}^{K-1}\sum_{j=0}^{K-1}(ij)c_{ij}-u_xu_y}{\sigma_x\sigma_y}$$

measures the correlation of the image gray;

Energy (angular second moment): $f_1=\sum_{i=0}^{K-1}\sum_{j=0}^{K-1}c_{ij}^2$ reflects distribution uniformity of image gray and thickness of the texture;

Homogeneity:

$$f_{13}=\sum_{i=1}^{M}\sum_{j=1}^{N}\left(\frac{P(i,j)}{1+|i-j|}\right)$$

reflects the similarity of the gray;

Variance:

$$f_{11}=\frac{1}{Q-1}\sum_{i=0}^{N-1}[P(i,j)-\mu]^2$$

reflects the distribution of the gray;

Maximum probability (MP):

$$f_{514}=\frac{frequency_{max}}{Q}$$

is the incidence of most outstanding pixel pairs;

Inverse difference moment (IDM):

$$f_3=\sum_{i=0}^{K-1}\sum_{j=0}^{K-1}\frac{1}{1+(i+j)^2}C_{ij}$$

reflects smoothness of the image;

Cluster tendency: $f_{10}=\sum_{i}^{M}\sum_{j}^{N}(i-j)^2 P(i,j)$ reflects the resolution of the image;

Sum mean: $f_6=\sum_{k=0}^{2k-2}kc_{x+y}(k)$ and difference mean: $f_7=\sum_{k=0}^{k-1}kc_{x-y}(k)$ provide the mean value of the image gray;

Sum entropy: $f_8=\sum_{k=0}^{2k-2}c_{x+y}(k)\log\{c_{x+y}(k)\}$ and difference entropy: $f_9=\sum_{k=0}^{k-1}c_{x-y}(k)\log\{c_{x-y}(k)\}$.

Adopting above method of the present invention to establish prediction models for early AD, the judging accuracy is increased to 100%.

Figure 1:
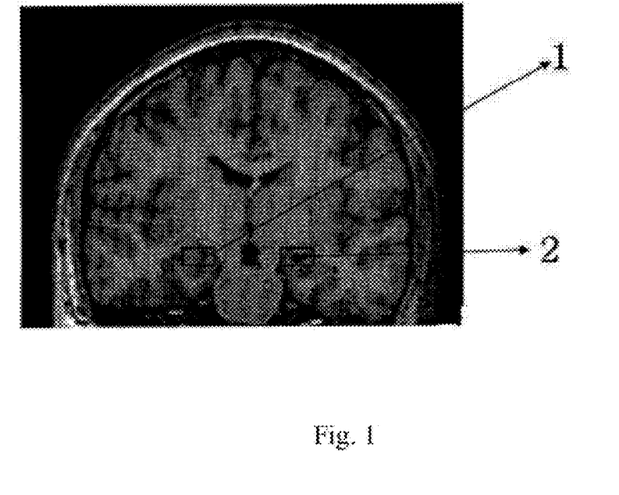
FIG. 1 is an original MRI image of a healthy elderly, wherein ROIs are marked with black boxes.
Figure 2:
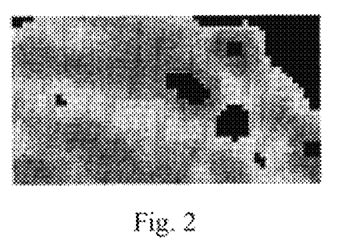
FIG. 2 is an enlarged image of left brain ROIs which is obtained by segmenting FIG. 1 by region growing method.
Figure 3:
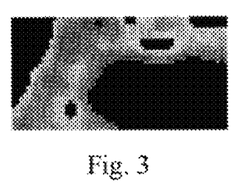
FIG. 3 is an enlarged image of right brain ROIs which is obtained by segmenting FIG. 1 by region growing method.
Figure 4:
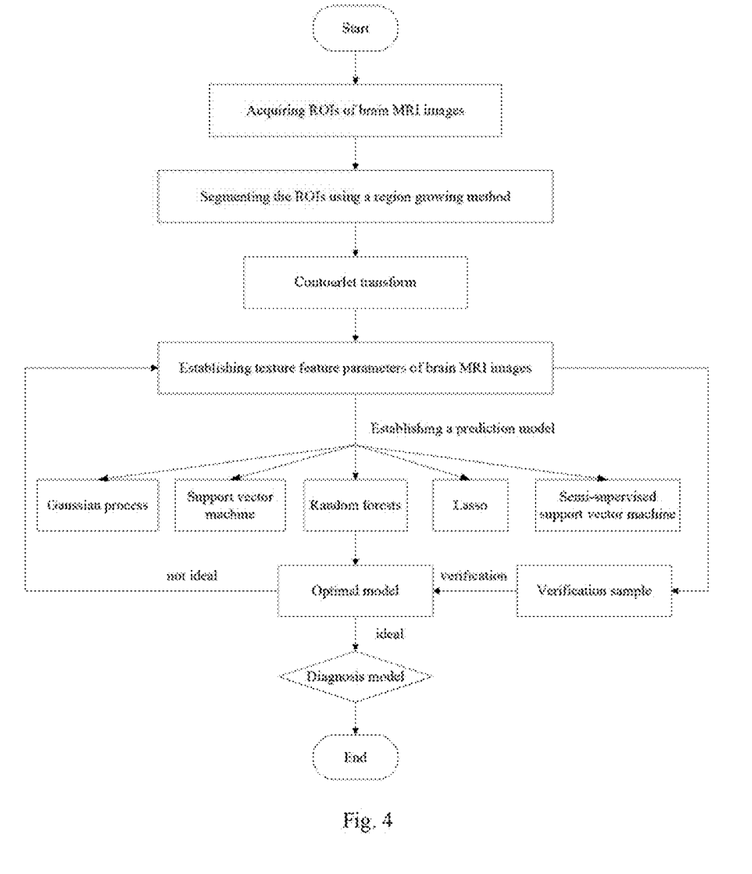
FIG. 4 is technical route for extracting multi-dimensional textures of the brain MRI images using the method of the present invention.

An example of extracting textures in the ROIs in provided below, its steps are as follows:

1, collecting original MRI images of the elderly of AD, MCI and the healthy elderly (the MRI image of the healthy elderly is provided in the drawings for example), as shown in FIG. 1;

2, segmenting the above images by region growing method to obtain images as shown in FIGS. 2 and 3; the segmentation is executed by directly running a written program;

3, extracting the texture feature parameters utilizing Contourlet transform, there is a corresponding program for each Contourlet transform method and the Contourlet transform can be executed by directly running the program.

Advantageous Effects

It is one innovation of the present invention to apply the region growing method to segment brain MRI images. It is proved by experiment that extracting texture by the region growing method to model is better than extracting texture by overall segmenting to model, which can reserve the margin information better.

Contourlet transform is an effective method to extract texture features in the brain MRI images, which can extract 14 texture feature parameters so as to reflect the texture features of images more fully.

It is proved by experiment that the specificity for predicting the sensitivity of early AD is 100% by extracting texture feature parameters from ROIs of brain MRI images of small sample to establish support vector machine prediction model. The small sample is obtained by utilizing the region growing method to segment ROIs, selecting 80% data as training samples and the rest 20% for verification samples, so as to test the consistency between determination of ROIs pathology by utilizing model and determination of ROIs by adopting pathological diagnosis.

From above data, it can be concluded that the support vector machine prediction model, which is established by adopting region growing method to segment ROIs of the brain MRI images and extracting texture feature parameters by Contourlet transform, takes a good effect in early AD added diagnosis.

BRIEF DESCRIPTION OF THE DRAWINGS

In the accompanying drawings: 1, left brain hippocampus, entorhinal cortex region; 2, right brain hippocampus, entorhinal cortex region.

DETAILED DESCRIPTION OF THE PREFERRED EMBODIMENT

The following embodiments are used to describe the model established by using the method of the present invention for predicting AD based on brain MRI images including related ROIs. They are only used to further explain the method of the present invention. However, the embodiments are not used to limit the application scope of the present invention. Actually, the method can also be used to determine properties of other type medical images.

The source of the images: brain MRI images of the elderly of AD, MCI and the healthy elderly shared on ADNI website, which are in form of .Nii and are read by MRIcro software.

Methods: programming with Matlab software, segmenting the ROIs in above MRI images with region growing method, and extracting texture feature parameters of related ROIs with Contourlet transform.

An embodiment for extracting texture feature parameters ROIs of brain MRI images is provided below; its steps are as follows:

1, respectively collecting a total of 504 original brain MRI images from 15 cases of AD illness, 15 cases of MCI illness, and 15 cases of healthy persons.

2, segmenting the images by the region growing method. A general method of the region growing method is used to segment the images. A programmed procedure is adopted, the threshold is set to be 35, and the procedure is directly executed. FIG. 1 is an example of image to be segmented and FIGS. 2 and 3 are figures obtained after segmentation.

3, adopting Contourlet transform to respectively extract the texture feature parameters.

4, adopting Contourlet transform to extract ROIs of brain MRI images to obtain 14 texture feature parameters to establish a prediction model.

When using the support vector machine model to predict the AD group and the MCI group, the classification effects are that the sensitivity is 100% and the specificity is 100% respectively. When predicting the AD group and the healthy group, the classification effects are that the sensitivity is 100% and the specificity is 100% respectively. When using the Lasso model to predict the AD group and the MCI group, the classification effects are that the sensitivity is 83.3% and the specificity is 100% respectively. When predicting the AD group and the healthy group, the classification effects are that the sensitivity is 73.7% and the specificity is 87.5% respectively.

It is proved by experiment that the specificity for predicting the sensitivity of early AD is 100% by extracting texture feature parameters from ROIs of brain MRI images of small sample to establish support vector machine prediction model. The small sample is obtained by utilizing the region growing method to segment ROIs, selecting 80% data as training samples and the rest 20% for verification samples, so as to test the consistency between determination of ROIs pathology by utilizing model and determination of ROIs by adopting pathological diagnosis.

From above data, it can be concluded that the support vector machine prediction model, which is established by adopting region growing method to segment ROIs of the brain MRI images and extracting texture feature parameters by Contourlet transform, takes a good effect in early AD added diagnosis.

We claim:

1. A method for establishing a prediction model based on multidimensional textures of brain nuclear magnetic resonance images, comprising segmenting the images using a region growing method, extracting, edge texture feature parameters of ROIs using Contourlet transform, establishing a database, and establishing the prediction model, the method specifically comprising the following steps:

(1) establishing a ROIs database;

(2) segmenting the ROIs in the images using the region growing method;

(3) processing the images using the Contourlet transform to extract the following variables: entropy, mean gray, correlation, energy, homogeneity, variance, maximum probability, inverse difference moment, cluster tendency, contrast, sum mean, difference mean, sum entropy and difference entropy;

(4) establishing a database of image feature parameters using the variables obtained in steps (2) and (3);

(5) establishing the prediction model according to the database in step (4), wherein methods for establishing the prediction model comprises Gaussian process, support vector machine, random forests, Lasso regression and semi-supervised support vector machine; and
(6) verifying the feature parameters obtained in step (4) using a sample to modify the prediction model so as to obtain an ideal model with correct results.

* * * * *